US00RE48261E

(19) United States
(12) Reissued Patent
Choi

(10) Patent Number: US RE48,261 E
(45) Date of Reissued Patent: Oct. 13, 2020

(54) IMAGE SCANNING UNIT AND IMAGE FORMING APPARATUS HAVING THE SAME

(71) Applicant: HEWLETT-PACKARD DEVELOPMENT COMPANY, L.P., Spring, TX (US)

(72) Inventor: Dong-ha Choi, Suwon-si (KR)

(73) Assignee: HEWLETT-PACKARD DEVELOPMENT COMPANY, L.P., Spring, TX (US)

(21) Appl. No.: 14/854,572

(22) Filed: Sep. 15, 2015

Related U.S. Patent Documents

Reissue of:
(64) Patent No.: 8,743,428
Issued: Jun. 3, 2014
Appl. No.: 11/247,141
Filed: Oct. 12, 2005

(30) Foreign Application Priority Data

Mar. 9, 2005 (KR) ..... 10-2005-0019577

(51) Int. Cl.
*H04N 1/04* (2006.01)
*H04N 1/10* (2006.01)
*H04N 1/107* (2006.01)

(52) U.S. Cl.
CPC ..... *H04N 1/103* (2013.01); *H04N 1/1072* (2013.01)

(58) Field of Classification Search
CPC ..... H04N 1/103; H04N 1/1072
(Continued)

(56) References Cited

U.S. PATENT DOCUMENTS 4,445,647 A * 5/1984 Deeg ..... B41J 15/02 242/598.4
4,982,235 A * 1/1991 Fujino ..... 358/497
(Continued)

FOREIGN PATENT DOCUMENTS

JP 54-50216 4/1979
JP 63-206063 8/1988
(Continued)

OTHER PUBLICATIONS

Notice of Allowance dated Jan. 21, 2014 in U.S. Appl. No. 11/247,141.
(Continued)

*Primary Examiner* — Joseph R Pokrzywa
(74) *Attorney, Agent, or Firm* — Staas & Halsey LLP

(57) ABSTRACT

An image scanning unit an image forming apparatus having the same to scan an image recorded on a document. The image scanning unit includes: a transparent window on which a document to be scanned is laid; an image sensor running straightly under the transparent window for capturing an image recorded on the document, a unit for driving the image sensor; a guide shaft for guiding the straight movement of the image sensor; and an image sensor carrier connected to the driving unit and the guide shaft for straightly moving the image sensor along the guide shaft when the driving unit operates. The image sensor carrier has an image sensor mounting surface on which the image sensor is mounted, and a guide shaft holder integrally formed with the image sensor mounting surface and mounted on the guide shaft.

20 Claims, 6 Drawing Sheets

(58) Field of Classification Search
USPC ..... 358/474
See application file for complete search history.

(56) References Cited

U.S. PATENT DOCUMENTS

| | | | | |
|---|---|---|---|---|
| 5,812,172 | A * | 9/1998 | Yamada | 347/171 |
| 6,246,492 | B1 * | 6/2001 | Chang et al. | 358/497 |
| 6,285,441 | B1 * | 9/2001 | Takahara | 355/67 |
| 6,342,957 | B1 * | 1/2002 | Itoh | 358/527 |
| 6,450,382 | B1 * | 9/2002 | Ohno | 226/21 |
| RE38,092 | E * | 4/2003 | Yamada et al. | 347/101 |
| 6,612,681 | B2 * | 9/2003 | Hasegawa et al. | 347/22 |
| 6,795,219 | B2 * | 9/2004 | Fujita | 358/496 |
| 6,952,292 | B2 * | 10/2005 | Takeuchi | H04N 1/031 358/474 |
| 7,088,476 | B2 * | 8/2006 | Yokota | H04N 1/03 358/474 |
| 7,348,693 | B2 * | 3/2008 | Sasaki | G02B 15/14 310/323.02 |
| 2002/0115224 | A1 * | 8/2002 | Rudel et al. | 436/164 |
| 2002/0176121 | A1 * | 11/2002 | Takei et al. | 358/497 |
| 2003/0001011 | A1 * | 1/2003 | Murata et al. | 235/440 |
| 2003/0184771 | A1 * | 10/2003 | Yamamoto et al. | 358/1.7 |
| 2004/0080550 | A1 * | 4/2004 | Lee et al. | 347/3 |
| 2005/0195242 | A1 * | 9/2005 | Samoto | B41J 19/00 347/37 |
| 2005/0195252 | A1 * | 9/2005 | Ishikawa | B41J 2/17509 347/84 |
| 2005/0225812 | A1 * | 10/2005 | Bledsoe et al. | 358/497 |
| 2005/0268429 | A1 * | 12/2005 | Akiyama et al. | 16/221 |
| 2006/0092481 | A1 * | 5/2006 | Nakano | H04N 1/1017 358/474 |

FOREIGN PATENT DOCUMENTS

| | | |
|---|---|---|
| JP | 4-312065 | 11/1992 |
| JP | 11-168592 | * 6/1999 |
| KR | 2004-37393 | 5/2004 |

OTHER PUBLICATIONS

Office Action dated Oct. 25, 2013 in U.S. Appl. No. 11/247,141.
Office Action dated Jun. 21, 2012 in U.S. Appl. No. 11/247,141.
Office Action dated Jan. 5, 2011 in U.S. Appl. No. 11/247,141.
Office Action dated Jul. 18, 2011 in U.S. Appl. No. 11/247,141.
Office Action dated Jun. 18, 2010 in U.S. Appl. No. 11/247,141.
Office Action dated Jun. 25, 2009 in U.S. Appl. No. 11/247,141.
Office Action dated Dec. 10, 2009 in U.S. Appl. No. 11 /247,141.
U.S. Appl. No. 11/247,141, filed Oct. 12, 2005, Dong-Ha Choi, Samsung Electronics Co., Ltd.

* cited by examiner

IMAGE SCANNING UNIT AND IMAGE FORMING APPARATUS HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue application of U.S. Pat. No. 8,743,428, issued on Jun. 3, 2014, which* claims the benefit of Korean Patent Application No. [2005-19577] *10-2005-0019577*, filed on Mar. 9, 2005 in the Korean Intellectual Property Office, the disclosure of which is incorporated herein in its entirety by reference.

BACKGROUND OF THE INVENTION

1. Field of the Invention

Aspects of the present invention relate to an image forming apparatus, and more particularly, to an image forming apparatus having an image scanning unit for scanning an image recorded on a document.

2. Description of the Related Art

An image forming apparatus is a device for printing an image on a sheet of paper. However, in recent years, more office applications require the use an image forming apparatus having an image scanning function (referred to as combined scanner/printer). The apparatus having the image scanning function (for example, a facsimile or scanner function) captures an image recorded on a document using an image sensor, and converts the image into digital image information to reproduce it on a piece of paper or a display unit.

To perform the scanning function, the image forming apparatus is provided with an image scanning unit. FIG. 1 shows one example of a conventional image scanning unit 10. Referring to FIG. 1, the image scanning unit 10 includes a flat transparent window 11 on which a document (not shown) that is to be scanned is laid, and an image sensor 15 running linearly under the transparent window 11 for capturing an image recorded on the document through a scanning process. A guide shaft 30 is disposed below the image sensor 15 to guide the linear movement of the image sensor 15 as indicated by the arrow.

The image sensor 15 is mounted to an image sensor carrier 20 made of metal. The guide shaft 30 is inserted into a guide shaft holder 25 that can reciprocate along the guide shaft 30. The image sensor carrier 20 is connected to the glide shaft holder 25 by a bolt 27. A spring 23 is interposed between the image sensor carrier 20 and the image sensor 15 so that the image sensor 15 is biased against the transparent window 11. The guide shaft holder 25 is connected to a belt (not shown) operated by a motor (not shown) in the same direction as a longitudinal direction of the guide shaft 30.

When an image reading command is input to the image scanning unit 10, the belt is operated by the motor, and thus the guide shaft holder 25 connected to the belt runs along the guide shaft 30. Hence, the image sensor 15 mounted to the image sensor carrier 20 runs linearly to scan the image recorded on the document, while in contact with the transparent window 11.

However, since the image sensor carrier 20 and the guide shaft holder 25 are separately manufactured and assembled, a size, in particular, a height, of the assembly is increased. Therefore, it is difficult to miniaturize the image forming apparatus having the image scanning unit. Also, because of the assembling process of the image scanning unit, the entire assembling time of the image forming apparatus increases, and dimensional tolerances between components accumulate and thereby the accuracy of a completed product is low. In addition, since the image sensor carrier 20 is made of metal, induced static electricity may result in malfunction or damage of the image sensor 15 or motor.

SUMMARY OF THE INVENTION

Aspects of the present invention provide an image scanning unit having an image sensor carrier of which an image-sensor mounting portion is integrally formed with a portion for accommodating a guide shaft, and an image forming apparatus having the image scanning unit.

According to an aspect of the present invention, there is provided an image scanning unit comprising: a transparent window on which a document to be scanned is laid; an image sensor running linearly under the transparent window for having an image recorded on the document; a driving unit to drive the image sensor; a guide shaft to guide the linear movement of the image sensor; and an image sensor carrier connected to the driving unit and the guide shaft for linearly moving the image sensor along the guide shaft when the driving unit operates, in which the image sensor carrier has an image sensor mounting surface on which the image sensor is mounted, and a guide shaft holder integrally formed with the image sensor mounting surface and mounted on the guide shaft.

In accordance with an aspect of the present invention, the driving unit includes a belt driven while extending in parallel with the guide shaft, and the image sensor carrier may include a belt fixing portion fixed to the belt.

In accordance with an aspect of the present invention, the image scanning unit further comprises a fixing unit to fix the image sensor to image sensor carrier, the image sensor fixing unit including a positioning boss formed at the image sensor, and a bracket provided to the image sensor carrier for receiving the positioning boss.

In accordance with an aspect of the present invention, the image sensor fixing unit may include a positioning boss formed at the image sensor carrier, and a groove formed at the image sensor for receiving the positioning boss.

In accordance with an aspect of the present invention, the image sensor carrier may be formed of a polymer resin through molding.

In accordance with an aspect of the present invention, the image sensor carrier may further include a tensioning portion for biasing the image sensor against the transparent window.

In accordance with an aspect of the present invention, the guide shaft holder may be provided on an internal surface thereof with a protrusion to reduce a frictional surface with an external surface of the guide shaft.

According to another aspect of the present invention, there is provided an image forming apparatus having an image printing unit for printing an image on a recording medium, and an image scanning unit for scanning the image recorded on a document, the image scanning unit including: a transparent window on which the document to be scanned is laid; an image sensor running linearly under the transparent window to capture the image recorded on the document;

a driving unit to drive the image sensor; a guide shaft to guide the linear movement of the image sensor; and an image sensor carrier connected to the driving unit and the guide shaft for moving linearly the image sensor along the guide shaft when the driving unit operates, in which the image sensor carrier has an image sensor mounting surface on which the image sensor is mounted, and a guide shaft holder integrally formed with the image sensor mounting surface and mounted on the guide shaft.

In accordance with an aspect of the present invention, the driving unit may include a belt driven while extending in parallel with the guide shaft, and the image sensor carrier may include a belt fixing portion fixed to the belt.

In accordance with an aspect of the present invention, the image scanning unit further comprises a fixing unit to fix the image sensor to the image sensor carrier, the image sensor fixing unit including a positioning boss formed at the image sensor, and a bracket provided to the image sensor carrier for receiving the positioning boss.

In accordance with an aspect of the present invention, the image sensor fixing unit includes a positioning boss formed at the image sensor carrier, and a groove formed at the image sensor for receiving the positioning boss.

In accordance with an aspect of the present invention, the image sensor carrier is formed of a polymer resin through molding.

In accordance with an aspect of the present invention, the image sensor carrier further includes a tensioning portion for biasing the image sensor against the transparent window.

In accordance with an aspect of the present invention, the guide shaft holder is provided on an internal surface thereof with a protrusion to reduce a frictional surface with an external surface of the guide shaft.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
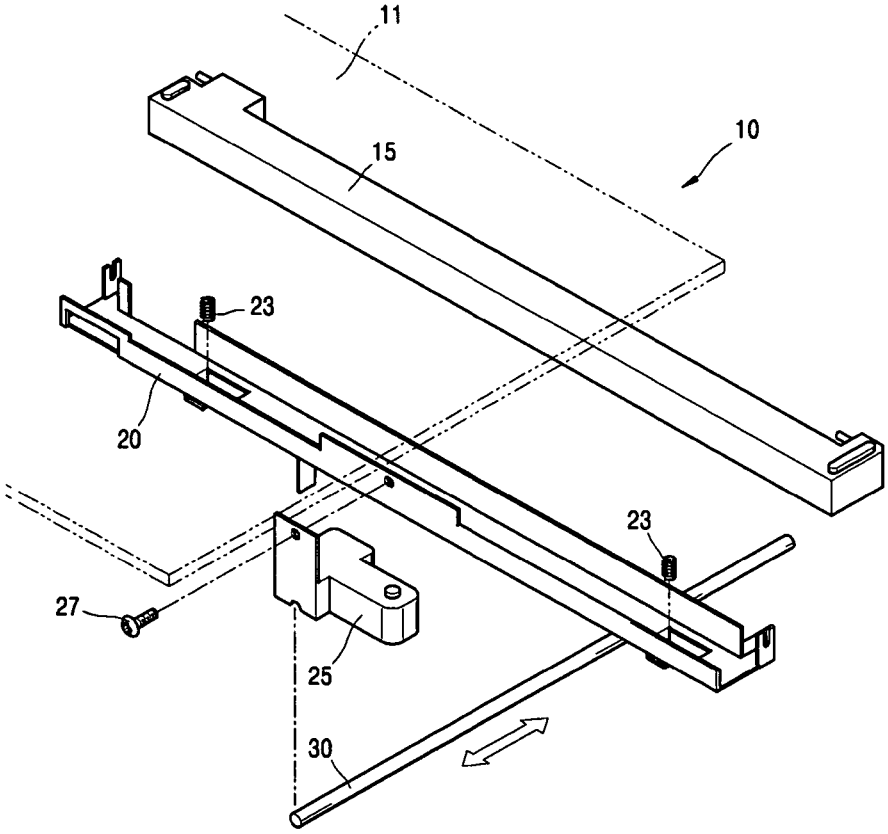
FIG. 1 (RELATED ART)
FIG. 1 is an exploded perspective view illustrating an example of a conventional image scanning unit.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
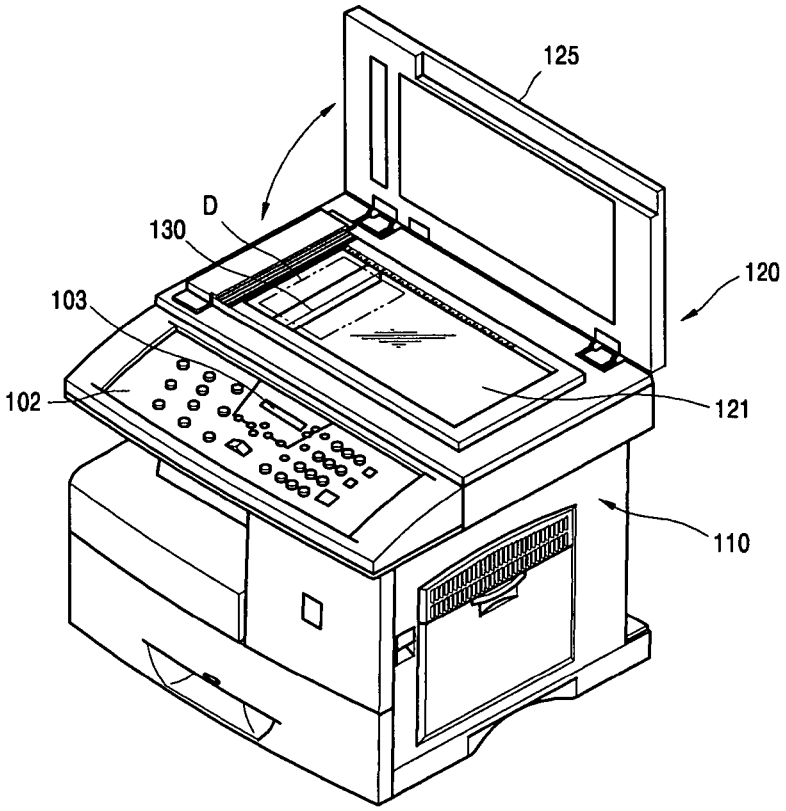
FIG. 2 is a perspective view of an image forming apparatus according to an embodiment of the present invention.

FIG. 2 shows of an image forming apparatus according to an embodiment of the present invention.

Referring to FIG. 2, the image forming apparatus is a combined scanner/printer having a function of printing an image on a sheet of paper and a function of scanning the image recorded on the paper, and includes an image printing unit 110, a scanning unit 120 disposed above the image printing unit 110, and an operating panel 102. The operating panel 102 is provided with buttons for inputting commands and a display portion 103 for indicating an operating state, option selections or the like of the apparatus to a user.

The image scanning unit 120 includes a transparent window 121 on which a document D to be scanned is laid, an image sensor 130 running linearly under the transparent window 121 for taking the image recorded on the document, and a flat cover 125 covering the transparent window 121 for shielding light emitted from the image sensor 130 from dispersing outwardly when capturing the image. The image sensor 130 may include a contact image sensor (CIS), a charge coupled device (CCD), or the like.

Figure 3:
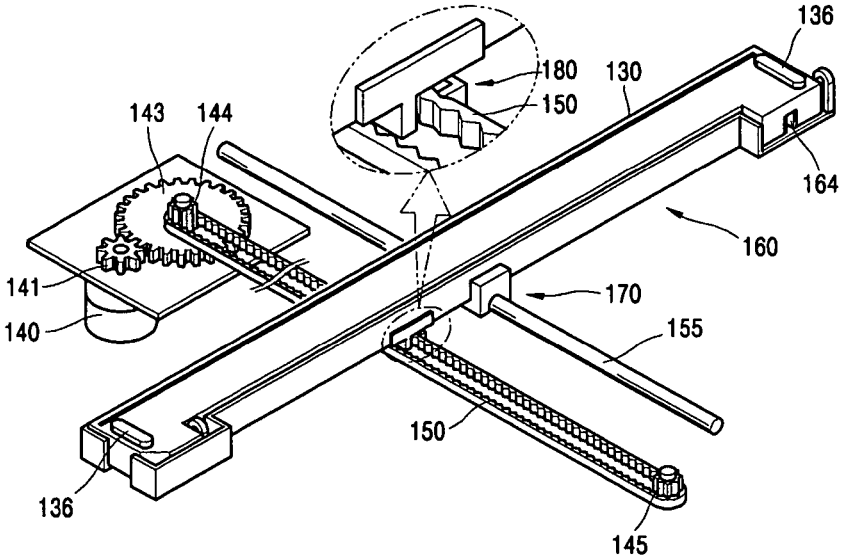
FIG. 3 is a perspective view of an image scanning unit of the image forming apparatus shown in FIG. 2.
Figure 4:
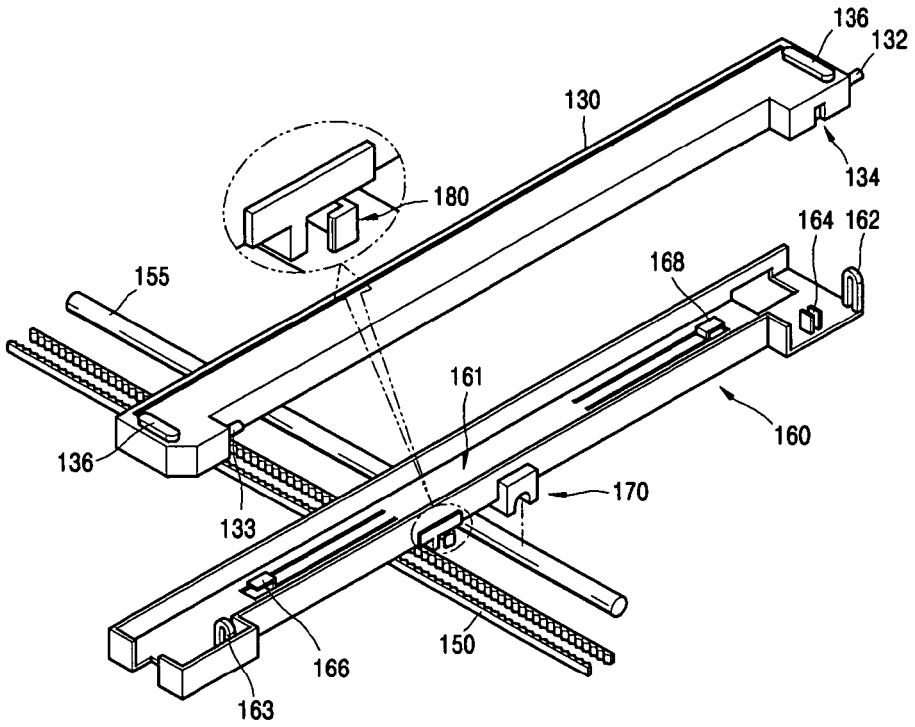
FIG. 4 is an exploded perspective view of the image scanning unit shown in FIG. 3.

FIGS. 3 and 4 show the image scanning unit provided to the image forming apparatus according to aspects of the present invention.

Referring to FIGS. 3 and 4, the image scanning unit 120 also includes an image sensor carrier 160 with the image sensor 130 mounted thereto under the transparent window 121 (FIG. 2), a driving unit for linearly reciprocating the image sensor carrier 160 in one direction, and a guide shaft 155 for guiding the straight movement of the image sensor carrier 160.

The guide shaft 155 is made of a metal rod, and extends in a direction perpendicular to a longitudinal direction of the image sensor 130. The driving unit includes a motor 140 and a belt 150 driven by the motor 140. The belt 150 extends in parallel with respect to the guide shaft 155, and is supported by a driving pulley 144 and a driven pulley 145. The driving pulley 144 is coaxial with and rotatably connected to a coupling gear 143 meshed with a motor shaft gear 141 of the motor 140. The belt 150 is provided on an inner surface thereof with internal gear teeth so as to prevent slippage. The driving pulley 144 and the driven pulley 145 are shaped so that they are meshed with the toothed inner surface of the belt 150.

The image sensor carrier 160 includes an image sensor mounting surface 161 for mounting the image sensor 130, a guide shaft holder 170 slidably mounted to the guide shaft 155, and a belt fixing portion 180 fixed to the belt 150. The image sensor carrier 160 is not made of metal, but is formed of polymer resin through molding.

A fixing unit for fixing the image sensor 130 is provided on the image sensor mounting surface 161 and the image sensor 130 to fix the image sensor 130 to the image sensor carrier 160. Specifically, the image sensor 130 is formed with first and second positioning bosses 132 and 133 for detachably mounting the image sensor 130 to the image sensor carrier 160. The image sensor carrier 160 is formed with first and second brackets 162 and 163 for receiving the positioning bosses 132 and 133. In order to assist positioning of the image sensor 130 when assembling the image sensor 130 and the image sensor carrier 160, the image sensor carrier 160 is formed with a positioning boss 164, and the image sensor 130 is formed with a groove 134 for receiving the positioning boss 164.

The image sensor mounting surface 161 is provided with first and second tensioning portions 166 and 168 for biasing the image sensor 130 against the transparent window 121 (FIG. 2), which replaces a conventional spring 23 shown in FIG. 1. The image sensor 130 moves linearly along the guide shaft 155, while spacers 136 protruded from both ends of the image sensor 130 are contacting the transparent window.

Figure 5:
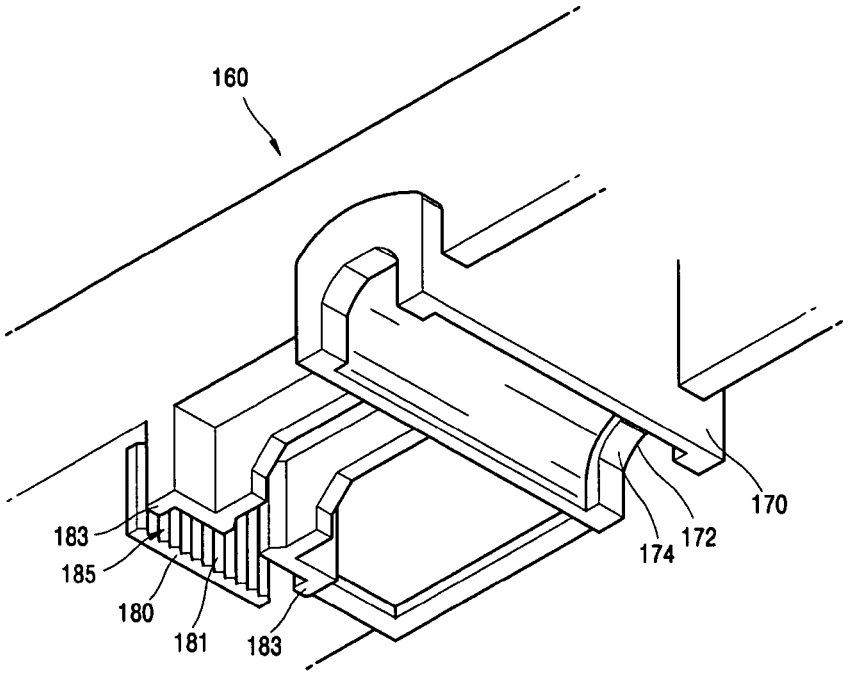
FIG. 5 is a bottom perspective view of the image sensor carrier in FIG. 4.
Figure 6:
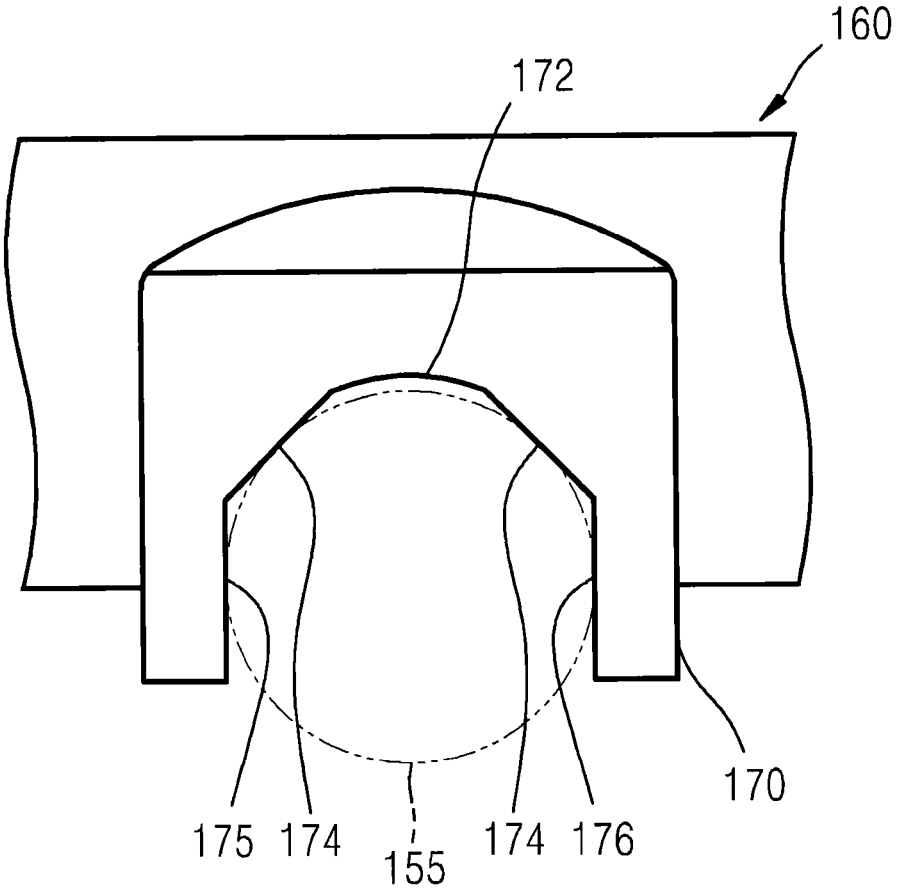
FIG. 6 is a front view of the image sensor carrier in FIG. 4.

FIGS. 5 and 6 show blown up portions of the image sensor carrier in FIG. 4.

Referring to FIGS. 5 and 6, the belt fixing portion 180 is formed with a toothed surface 181 meshed with the internal gear teeth of the belt 150 to prevent the belt fixing portion 180 from slipping on the belt 150 (FIGS. 3 and 4), and belt pressing bosses 183 for tightly contacting the belt 150 with the toothed surface 181. The belt 150 is inserted into a slot 185 formed between the toothed surface 181 and the belt pressing bosses 183.

The guide shaft holder 170 has an approximately semi-circular internal surface 172 forming a channel matching with the guide shaft 155, so that the guide shaft holder 170 slides on the guide shaft 155. The guide shaft holder 170 is provided on the internal surface thereof with a protrusions formed as planar faces 175, 176 and 174 so as to reduce a contacting surface with an external surface of the guide shaft 155 and thereby reduce friction therebetween. The first and second planar faces 175 and 176 engage the guide shaft at approximately 180 degree intervals along the diameter of the guide shaft and are substantially parallel to each other According to aspects of the image scanning unit of the present invention, the image sensor carrier includes the image sensor mounting surface integrally formed with the guide shaft holder mounted on the guide shaft, thereby reducing a height of the image scanning unit. Hence, the image scanning unit and the image forming apparatus having the same can be miniaturized.

Since the number of components is reduced as compared with a conventional assembly, an assembly time of the image scanning unit can be shortened. Also, dimensional tolerances attributable to the number of components do not accumulate, and thereby the assembling accuracy of the image scanning unit compared to the conventional unit can be improved.

Furthermore, according to the embodiments of the present invention, since the image sensor carrier is formed of the polymer resin, it is possible to prevent malfunction of the image sensor or motor due to the static electricity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image scanning device for use in an image forming apparatus which includes a guide shaft to control a motion of the image scanning device, comprising:

a carriage including an integrally formed channel having a substantially semi-circular shape and a plurality of friction reducing protrusions spaced intermittently around a diameter of the guide shaft to engage the guide shaft and wherein the channel is formed of a rigid material, the channel includes first and second friction reducing protrusions formed as first and second planar faces engaging the guide shaft at 180 degree intervals along the diameter of the guide shaft and the first and second planar faces are substantially parallel to each other and the channel further includes a third friction reducing protrusion formed as a third planar face engaging the guide shaft, *the third planar face extending from one of the first and second planar faces at an incline in a direction non-perpendicular to the first and second planar faces, the channel further including a non-planar face which does not engage the guide shaft, the non-planar face extending at one end from the third planar face and being spaced apart from the guide shaft*;

an image sensor detachably mounted on the carriage; and a driver to linearly move the carriage and the image sensor along the guide shaft.

2. The image scanning device according to claim 1, wherein the driver comprises a motor driving a belt extending in parallel with respect to the guide shaft, and the carriage includes a belt grasper engaging the belt such that when the belt is driven the carriage is linearly moved by the belt.

3. The image scanning device according to claim 1, further comprising a coupler to attach the image sensor to the carriage, in which the coupler includes a positioning boss formed on the image sensor, and a bracket provided on the carriage to receive the positioning boss.

4. The image scanning device according to claim 1, further comprising a coupler to attach the image sensor to the carriage, in which the coupler includes a positioning boss formed on the carriage, and a notch formed on the image sensor to receive the positioning boss.

5. The image scanning device according to claim 1, wherein the carriage is formed of a polymer resin through molding.

6. The image scanning device according to claim 1, wherein the carriage further comprises a tensioner to bias the image sensor against a transparent work surface of the image forming apparatus.

7. An image scanning device for use in an image forming apparatus which includes a guide shaft to control a motion of the image scanning device, comprising:

a non-metallic carriage including an integrally formed channel having a substantially semi-circular shape and a plurality of friction reducing protrusions spaced intermittently around a diameter of the guide shaft to engage the guide shaft and wherein the channel is formed of a rigid material, the channel includes first and second friction reducing protrusions formed as first and second planar faces engaging the guide shaft at 180 degree intervals along the diameter of the guide shaft and the first and second planar faces are substantially parallel to each other and the channel further includes a third friction reducing protrusion formed as a third planar face engaging the guide shaft, *the third planar face extending from one of the first and second planar faces at an incline in a direction non-perpendicular to the first and second planar faces, the channel further including a non-planar face which does not engage the guide shaft, the non-planar face extending at one end from the third planar face and being spaced apart from the guide shaft*;

an image sensor detachably mounted on the non-metallic carriage; and a driver to linearly move the non-metallic carriage and the image sensor along the guide shaft.

8. The image scanning device according to claim 7, wherein the non-metallic carriage is formed of a polymer resin through molding.

9. The image scanning device according to claim 8, wherein the driver comprises a motor driving a belt extending in parallel with respect to the guide shaft, and the carriage includes a belt grasper engaging the belt such that when the belt is driven the carriage is linearly moved by the belt.

*10. An image scanning device for use in an image forming apparatus which includes a guide shaft to control a motion of the image scanning device, comprising:*

*a carriage including an integrally formed channel having a plurality of portions spaced intermittently around a diameter of the guide shaft to intermittently engage the guide shaft, wherein the channel is formed of a rigid material and the plurality of portions include:*

*first and second portions, formed as first and second planar faces substantially parallel to each other, to engage the guide shaft at 180 degree intervals along the diameter of the guide shaft, and*

*a third portion, formed as a third planar face which extends from one of the first and second planar faces at an incline in a direction non-perpendicular to the first and second planar faces, to engage the guide shaft,*

*wherein the channel further includes a non-planar face which does not engage the guide shaft, the non-planar face extending at one end from the third planar face and being spaced apart from the guide shaft;*

*an image sensor detachably mounted on the carriage; and*

*a driver to linearly move the carriage and the image sensor along the guide shaft.*

*11. The image scanning device according to claim 10, wherein the third portion is between the first and second portions.*

*12. The image scanning device according to claim 11, wherein the channel includes a first part spaced apart from the guide shaft between the first portion and the third portion.*

*13. The image scanning device according to claim 11, wherein the channel includes a second part spaced apart from the guide shaft between the second portion and the third portion.*

*14. The image scanning device according to claim 11, wherein the channel includes at least two parts that are spaced apart from the guide shaft between the first portion and the second portion.*

*15. An image scanning device, comprising:*

*a guide shaft;*

*a carriage including an integrally formed channel having a plurality of portions spaced intermittently around a diameter of the guide shaft to intermittently engage the guide shaft, the plurality of portions including:*

*first and second portions, formed as first and second planar faces substantially parallel to each other, to engage the guide shaft at 180 degree intervals along the diameter of the guide shaft, and*

*third and fourth portions, formed as third and fourth planar faces and separated by a part of the channel that does not engage the guide shaft, to engage the guide shaft,*

*wherein the channel further includes a fifth portion having a non-planar face which does not engage the guide shaft, the non-planar face extending at one end from the third planar face and extending at another end from the fourth planar face, and being spaced apart from the guide shaft;*

*an image sensor mounted on the carriage; and*

*a driver to move the carriage and the image sensor along the guide shaft.*

*16. The image scanning device according to claim 15, wherein the third and fourth portions are between the first and second portions.*

*17. The image scanning device according to claim 16, wherein the channel includes a first part spaced apart from the guide shaft between the first portion and the third portion.*

*18. The image scanning device according to claim 16, wherein the channel includes a second part spaced apart from the guide shaft between the second portion and the fourth portion.*

*19. The image scanning device according to claim 15, wherein the first and second portions, formed as the first and second planar faces, extend in a direction away from the part of the channel that does not engage the guide shaft beyond a center of the guide shaft.*

*20. The image scanning device according to claim 15, wherein the non-planar face is an arc-shaped face.*

* * * * *